United States Patent
Liu et al.

(10) Patent No.: US 11,379,085 B2
(45) Date of Patent: Jul. 5, 2022

(54) TOUCH MODULE

(71) Applicant: TPK Advanced Solutions Inc., Fujian (CN)

(72) Inventors: Qi Bin Liu, Xiamen (CN); Kuo Lung Fang, Hsinchu (TW); Ya Mei Chen, Xiamen (CN); Ya Ting Hsu, Lunbei Township, Yunlin County (TW)

(73) Assignee: TPK Advanced Solutions Inc., Fujian (CN)

( * ) Notice: Subject to any disclaimer, the term of this patent is extended or adjusted under 35 U.S.C. 154(b) by 0 days.

(21) Appl. No.: 17/086,543

(22) Filed: Nov. 2, 2020

(65) Prior Publication Data
US 2022/0137748 A1 May 5, 2022

(51) Int. Cl.
*G06F 3/041* (2006.01)
*G06F 3/044* (2006.01)

(52) U.S. Cl.
CPC .. *G06F 3/0445* (2019.05); *G06F 2203/04111* (2013.01)

(58) Field of Classification Search
CPC ............. G06F 3/0445; G06F 2203/04111
See application file for complete search history.

(56) References Cited

U.S. PATENT DOCUMENTS

| | | | |
|---|---|---|---|
| 2014/0211102 A1* | 7/2014 | Kang | G06F 3/0445 349/12 |
| 2014/0362043 A1* | 12/2014 | Chu | G06F 3/0446 345/174 |
| 2015/0077650 A1* | 3/2015 | Huang | G06F 3/0445 29/842 |
| 2017/0277302 A1* | 9/2017 | Cho | G06F 3/0443 |
| 2020/0133435 A1* | 4/2020 | Liu | G06F 3/0443 |
| 2020/0183541 A1 | 6/2020 | Toyooka et al. | |

FOREIGN PATENT DOCUMENTS

TW        M527126 U        8/2016

* cited by examiner

*Primary Examiner* — Md Saiful A Siddiqui
(74) *Attorney, Agent, or Firm* — Cooper Legal Group, LLC (57) ABSTRACT

The present disclosure relates to the field of touch technology, and provides a touch module, which includes a substrate, a first bridging layer, a first touch sensing layer, a second bridging layer, and a second touch sensing layer. The first bridging layer extends on the substrate along a first direction. The first touch sensing layer is disposed on the substrate and includes a plurality of first touch sensing electrodes, wherein the first bridging layer connects adjacent first touch sensing electrodes of the first touch sensing electrodes. The second bridging layer is disposed on the first bridging layer, located between the adjacent first touch sensing electrodes, and connected in parallel with the first bridging layer. The second touch sensing layer is disposed on the substrate, crosses the second bridging layer along a second direction, and is disposed between the adjacent first touch sensing electrodes.

17 Claims, 4 Drawing Sheets

TOUCH MODULE

BACKGROUND

Field of Disclosure

The present disclosure relates to the field of touch technology, and in particular, to a touch module with low lap-joint impedance.

Description of Related Art

In recent years, as the touch technology has developed, transparent conductors have often been applied in many display or touch-related devices since transparent conductors can allow light to pass through while providing proper conductivity. In general, the transparent conductors may be various metal oxides, such as indium tin oxide (ITO), indium zinc oxide (IZO), cadmium tin oxide (CTO), or aluminum-doped zinc oxide (AZO). However, films made of these metal oxides cannot meet the requirements for flexibility of display devices. Therefore, a variety of flexible transparent conductors, such as a transparent conductor made of a material such as a metal nanowire, have been developed nowadays.

However, there are still many problems to be solved for display or touch devices made of the metal nanowires. For example, when metal nanowires are used to make a touch electrode and the foregoing various metal oxides are used to make a jumper electrode for connecting the touch electrode, a contact area between the jumper electrode and the touch electrode is often increased by increasing the volume at the end of the jumper electrode in order to make the contact impedance between the touch electrode and the jumper electrode meet specification requirements, so as to reduce the contact impedance. However, this often causes an overlapping portion of the jumper electrode and the touch electrode to be visible by a user when the touch display device is in operation, thus affecting the visual clarity of the touch display device.

SUMMARY

In order to overcome the problem that a jumper electrode is visible by a user in a visible area of a touch display device due to an excessively large contact area between the jumper electrode and a touch electrode, the present disclosure provides a touch module with a metal jumper electrode. The metal jumper electrode is connected in parallel with a metal oxide jumper electrode to reduce the contact impedance between the metal oxide jumper electrode and the touch electrode. In this way, the requirement for the low contact impedance of the touch module can be met while keeping or even reducing the contact area between the metal oxide jumper electrode and the touch electrode. In other words, the present disclosure solves the visibility of the jumper electrode caused by the excessively large contact area between the jumper electrode and the touch electrode by the design of the jumper electrode.

The present disclosure adopts the following technical solutions: a touch module, including a substrate, a first bridging layer, a first touch sensing layer, a second bridging layer, and a second touch sensing layer. The first bridging layer extends on the substrate along a first direction. The first touch sensing layer is disposed on the substrate and includes a plurality of first touch sensing electrodes, wherein the first bridging layer connects adjacent first touch sensing electrodes of the first touch sensing electrodes. The second bridging layer is disposed on the first bridging layer, located between the adjacent first touch sensing electrodes, and connected in parallel with the first bridging layer. The second touch sensing layer is disposed on the substrate, crosses the second bridging layer along a second direction, and is disposed between the adjacent first touch sensing electrodes.

In some embodiments, a material of the second bridging layer includes copper, aluminum, copper alloy, aluminum alloy, or combinations thereof.

In some embodiments, an impedance value of the second bridging layer is between $0.20\Omega$ and $0.24\Omega$.

In some embodiments, a material of the first bridging layer includes indium tin oxide, indium zinc oxide, cadmium tin oxide, aluminum-doped zinc oxide, or combinations thereof, and a material of each of the first touch sensing layer and the second touch sensing layer includes a matrix and a plurality of metal nanostructures distributed in the matrix.

In some embodiments, a vertical projection area of the second bridging layer onto the substrate is smaller than a vertical projection area of the first bridging layer onto the substrate, and the vertical projection area of the second bridging layer onto the substrate is completely within the vertical projection area of the first bridging layer onto the substrate.

In some embodiments, two ends of the first bridging layer are respectively embedded into the adjacent first touch sensing electrodes, and a lateral contact area between each of the ends and each of the adjacent first touch sensing electrodes is between 5000 and 10000 $\mu m^2$.

In some embodiments, the first direction is perpendicular to the second direction.

In some embodiments, the touch module further includes an insulating layer laterally extending between the second bridging layer and the second touch sensing layer.

In some embodiments, the insulating layer is embedded between the first touch sensing electrodes and the second bridging layer.

In some embodiments, the second touch sensing layer includes a plurality of second touch sensing electrodes and a plurality of connecting electrodes, and the connecting electrodes connect the second touch sensing electrodes and cross the second bridging layer.

BRIEF DESCRIPTION OF THE DRAWINGS

The disclosure can be more fully understood by reading the following detailed description of the embodiments, with reference made to the accompanying drawings as follows.

DETAILED DESCRIPTION

Reference will now be made in detail to the present embodiments of the disclosure, examples of which are illustrated in the accompanying drawings. Wherever possible, the same reference numbers are used in the drawings and the description to refer to the same or like parts.

In addition, relative terms such as "lower" or "bottom" and "upper" or "top" can be used herein to describe the relationship between one element and another element, as shown in the figures. It should be understood that relative terms are intended to include different orientations of the device other than those shown in the figures. For example, if the device in one figure is turned over, elements described as being on the "lower" side of other elements will be oriented on the "upper" side of the other elements. Therefore, the exemplary term "lower" may include an orientation of "lower" and "upper", depending on the specific orientation of the drawing. Similarly, if the device in one figure is turned over, elements described as "below" other elements will be oriented "above" the other elements. Therefore, the exemplary term "below" can include an orientation of "above" and "below".

Figure 1:
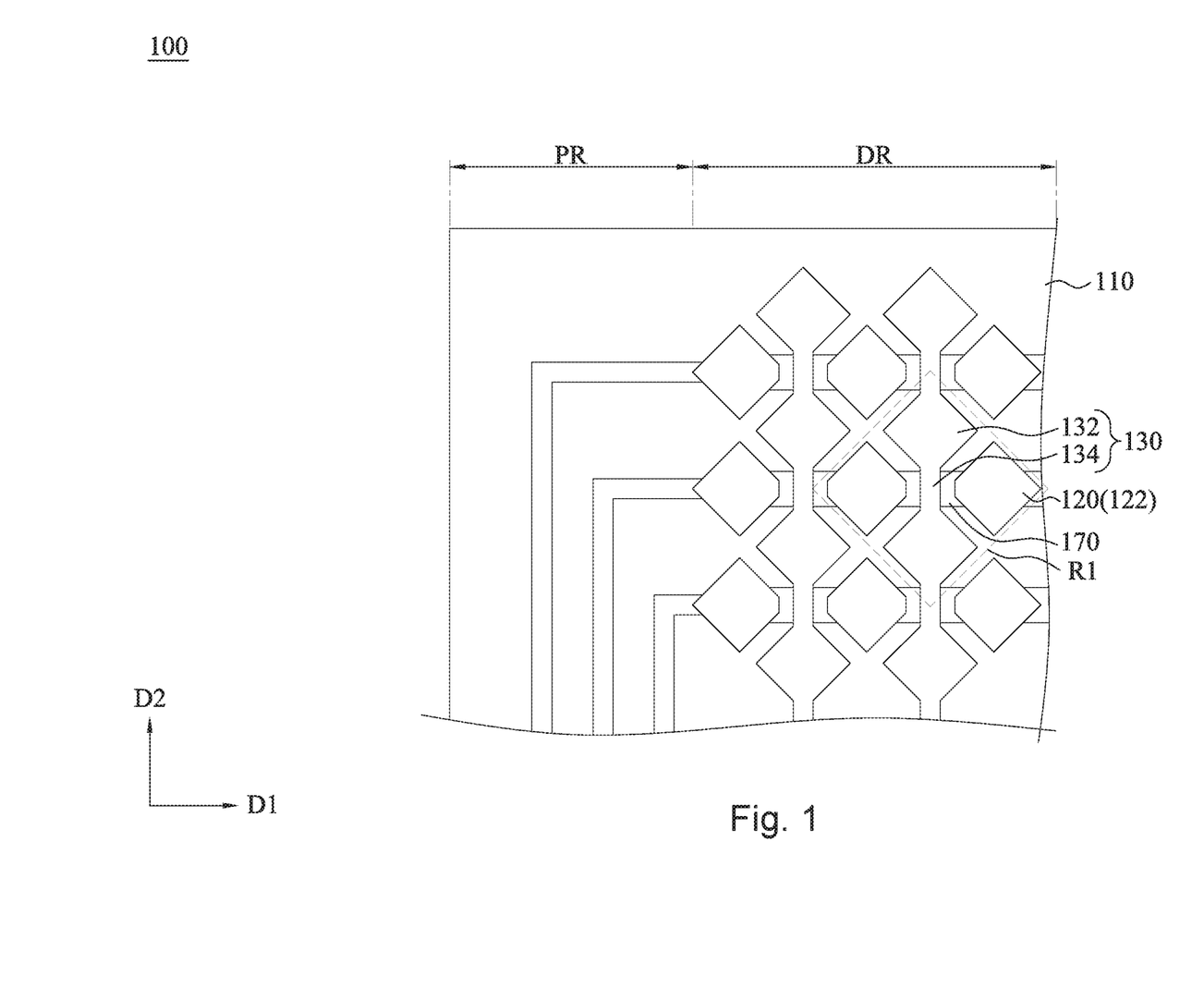
FIG. 1 is a schematic top view of a touch module according to some embodiments of the present disclosure.
Figure 2:
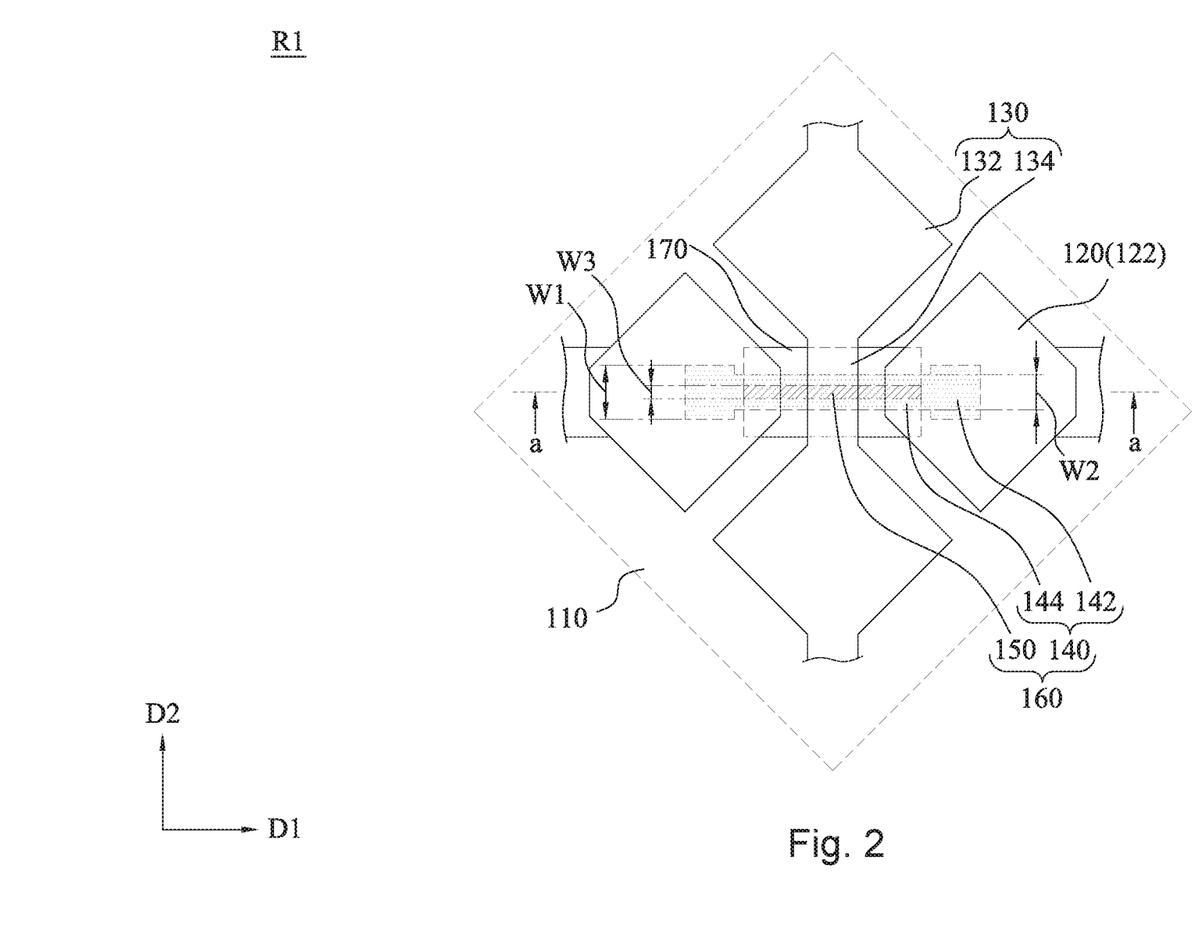
FIG. 2 is a partially enlarged perspective view of an area R1 of the touch module of FIG. 1.

FIG. 1 is a schematic top view of a touch module 100 according to some embodiments of the present disclosure. FIG. 2 is a partially enlarged perspective view of an area R1 of the touch module 100 of FIG. 1. Referring to FIGS. 1 and 2, the touch module 100 of the present disclosure is a single-sided bridge touch module. The touch module 100 includes a substrate 110, a first touch sensing layer 120, a second touch sensing layer 130, and a plurality of first bridging layers (also called first jumper electrodes) 140. In some embodiments, the substrate 110 has a visible area DR and a peripheral area PR located around the visible area DR, and the first touch sensing layer 120, the second touch sensing layer 130, and the first jumper electrodes 140 are disposed in the visible area DR of the substrate 110. The first touch sensing layer 120 is disposed on the substrate 110 and includes a plurality of first touch sensing electrodes 122 arranged along a first direction D1. Each of the first jumper electrodes 140 extends on the substrate 110 along the first direction D1 and is located between adjacent first touch sensing electrodes 122, and interconnects the adjacent first touch sensing electrodes 122. In other words, a plurality of the first jumper electrodes 140 interconnects a plurality of the first touch sensing electrodes 122 to form an electron transmission path extending along the first direction D1. The second touch sensing layer 130 is disposed on the substrate 110 and located between the adjacent first touch sensing electrodes 122 and includes a plurality of second touch sensing electrodes 132 and a plurality of connecting electrodes 134 arranged along a second direction D2, wherein the second touch sensing electrodes 132 and the connecting electrodes 134 are alternately arranged along the second direction D2, and the connecting electrodes 134 can interconnect adjacent second touch sensing electrodes 132. In other words, a plurality of the connecting electrodes 134 interconnect a plurality of the second touch sensing electrodes 132 to form an electron transmission path extending along the second direction D2. Further, the connecting electrodes 134 of the second touch sensing layer 130 cross the first jumper electrodes 140 from above the first jumper electrodes 140 along the second direction D2, thereby forming the touch module 100 with a single-sided double-layer electrode structure. The touch module 100 of the present disclosure further includes a second bridging layer (also called a second jumper electrode) 150. The second jumper electrode 150 is disposed on the first jumper electrode 140 and connected to the first jumper electrode 140 in parallel. According to the present disclosure, the contact impedance between the first touch sensing layer 120 and the first jumper electrode 140 is reduced by the arrangement of the second jumper electrode 150, such that a resistive capacitive loading (RC loading) value of the touch module 100 is reduced, and the contact area between the first touch sensing layer 120 and the first jumper electrode 140 is reduced, thereby solving the visibility problem of the first jumper electrode 140 in the visible area DR, which will be discussed in more detail in the following descriptions.

In some embodiments, the first touch sensing layer 120 can be arranged along an X axis, and the second touch sensing layer 130 can be arranged along a Y axis. That is, an extending direction of the first touch sensing layer 120 and an extending direction of the second touch sensing layer 130 are perpendicular to each other on a plane formed by the X axis and the Y axis. In other words, the first touch sensing layer 120 can serve as a horizontal touch sensing electrode, while the second touch sensing layer 130 can be serve as a vertical touch sensing electrode. In some embodiments, the connecting electrodes 134 of the second touch sensing layer 130 cross the second jumper electrodes 150 from above the second jumper electrodes 150 along the second direction D2. In some embodiments, the first touch sensing layer 120 and the second touch sensing layer 130 (including the second touch sensing electrodes 132 and the connecting electrodes 134) may each include a matrix and a plurality of metal nanowires (also called metal nanostructures) distributed in the matrix. The matrix may include polymers or a mixture thereof to impart specific chemical, mechanical, and optical properties to the first touch sensing layer 120 and the second touch sensing layer 130. For example, the matrix can provide good adhesion between the first touch sensing layer 120, the second touch sensing layer 130, and other layers. As another example, the matrix can also provide good mechanical strength for the first touch sensing layer 120 and the second touch sensing layer 130. In some embodiments, the matrix may include a specific polymer, such that the first touch sensing layer 120 and the second touch sensing layer 130 have additional scratch-resistant and wear-resistant surface protection, thereby improving the surface strengths of the first touch sensing layer 120 and the second touch sensing layer 130. The foregoing specific polymer may be polyacrylate, epoxy resin, polysiloxane, polysilane, polyurethane, poly(silicon-acrylic acid), or combinations thereof. In some embodiments, the matrix may further include a crosslinking agent, a surfactant, a stabilizer (including but not limited to an antioxidant or an ultraviolet stabilizer, for example), a polymerization inhibitor, or combinations thereof, thereby improving the ultraviolet resistance of the first touch sensing layer 120 and the second touch sensing layer 130 and prolonging their service lives.

In some embodiments, the metal nanowires may include, for example but not limitation, silver nanowires, gold nanowire, copper nanowires, nickel nanowires, or combinations thereof. More specifically, the term "metal nanowire" used herein is a collective noun, which refers to a collection of metal wires that include multiple metal elements, metal alloys, or metal compounds (including metal oxides), and the number of metal nanowires included therein does not affect the scope of the present disclosure. Since the metal nanowires of the present disclosure have excellent light transmittance, when the touch module 100 is configured to serve as a touch display module, the metal nanowires can provide good conductivity for the first touch sensing layer 120 and the second touch sensing layer 130 without affecting the optical properties of the touch module 100.

In some embodiments, a cross-sectional size (e.g., a diameter of the cross section) of a single metal nanowire can be less than 500 nm, preferably less than 100 nm, and more preferably less than 50 nm, such that the first touch sensing layer 120 and the second touch sensing layer 130 have a low haze. In detail, when the cross-sectional size of the single metal nanowire is greater than 500 nm, the single metal nanowire is excessively thick, resulting in an excessively high haze of the first touch sensing layer 120 and the second touch sensing layer 130, thus affecting the visual clarity of the visible area DR of the touch module 100. In some embodiments, an aspect ratio (length:diameter) of the metal nanowire may be between 10 and 100,000, such that the first touch sensing layer 120 and the second touch sensing layer 130 can have a lower electrical resistivity, a higher light transmittance, and a lower haze. In detail, when the aspect ratio of a single metal nanowire is less than 10, a conductive network may not be well formed, resulting in an excessively high resistivity of the first touch sensing layer 120 and the second touch sensing layer 130. Therefore, the metal nanowires must be distributed in the matrix with a greater arrangement density (i.e., the number of metal nanowires included in the first touch sensing layer 120 and the number of metal nanowires included in the second touch sensing layer 130 per unit volume) in order to improve the conductivity of the first touch sensing layer 120 and the second touch sensing layer 130, such that the first touch sensing layer 120 and the second touch sensing layer 130 can have an excessively low light transmittance and an excessively high haze. It is noted that other terms such as silk, fiber, or tube also have the aforementioned cross-sectional dimensions and aspect ratios, which also fall within the scope of the present disclosure.

Figure 3:
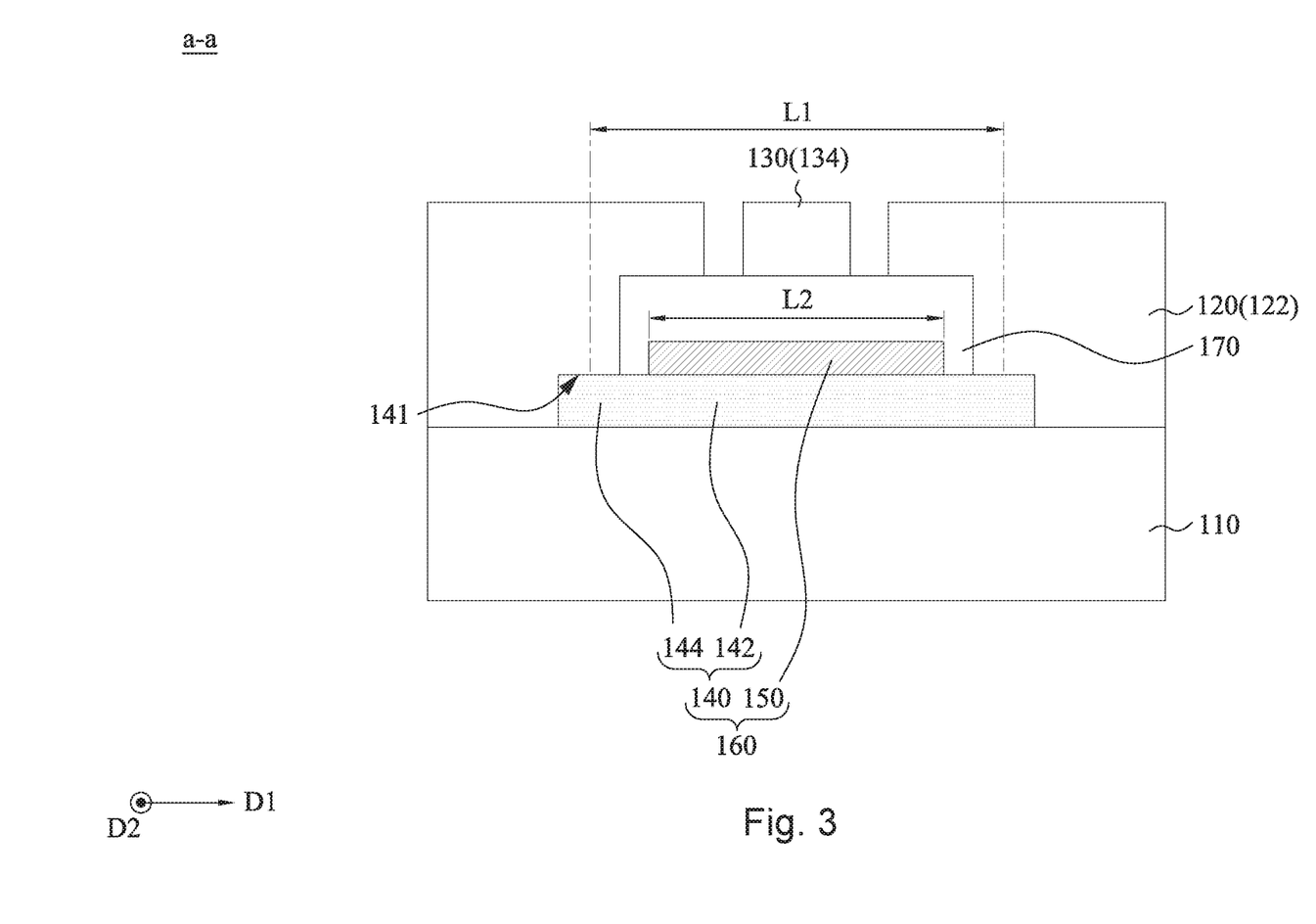
FIG. 3 is a schematic view of a cross-section of the touch module of FIG. 2 taken along a line segment a-a.

FIG. 3 is a schematic view of a cross-section of the touch module 100 of FIG. 2 taken along a line segment a-a. Referring to FIGS. 2 and 3, the first jumper electrode 140 extends on the substrate 110 along the first direction D1 and connects the adjacent first touch sensing electrodes 122. Specifically, the first jumper electrode 140 has two ends 142 and an intermediate section 144 sandwiched between the two ends 142 in the first direction D1, and the two ends 142 of the first jumper electrode 140 are embedded into the adjacent first touch sensing electrodes 122, respectively. In some embodiments, the two ends 142 of the first jumper electrode 140 are respectively sandwiched between the substrate 110 and the first touch sensing electrode 122 in a direction perpendicular to the extending direction of the substrate 110 (i.e., perpendicular to the first direction D1 and the second direction D2), and the two ends 142 are in contact with the substrate 110 and the first touch sensing electrode 122. In some embodiments, the intermediate section 144 of the first jumper electrode 140 may also be partially sandwiched between the substrate 110 and the first touch sensing electrode 122 and is in contact with the substrate 110 and the first touch sensing electrode 122. In some embodiments, when viewed from a top view angle (i.e., from a viewing angle of FIG. 2), the first jumper electrode 140 may be, for example, dumbbell-shaped. That is, a width W1 of two ends 142 of the first jumper electrode 140 along the second direction D2 is greater than a width W2 of the intermediate section 144 along the second direction D2, such that the first jumper electrode 140 has a certain contact area with the first touch sensing electrode 122. This reduces the contact impedance between the first jumper electrode 140 and the first touch sensing electrode 122. In some embodiments, a material of the first jumper electrode 140 may include indium tin oxide, indium zinc oxide, cadmium tin oxide, aluminum-doped zinc oxide, or combinations thereof. Since the foregoing materials have excellent light transmittance, when the touch module 100 is configured to serve as a touch display module, the foregoing materials will not affect the optical properties (e.g., the optical transmittance and clarity) of the touch module 100. Further, since the foregoing materials are metal oxide materials with low reactivity, the materials do not undergo spontaneous electrochemical reactions (such as ionic redox reaction) with metal nanowires in the first touch sensing electrode 122. This prevents the surface oxidation of the first jumper electrode 140 and improves the contact stability between the first touch sensing electrode 122 and the first jumper electrode 140.

In some embodiments, the second jumper electrode 150 is superimposed on the first jumper electrode 140, extends along the first direction D1, and is located between the adjacent first touch sensing electrodes 122 to be connected in parallel with the first jumper electrode 140. In some embodiments, a material of the second jumper electrode 150 may include copper, aluminum, copper alloy, aluminum alloy, or combinations thereof. By selection of the foregoing materials, the second jumper electrode 150 can have a low impedance. In this way, when connected in parallel, the second jumper electrode 150 and the first jumper electrode 140 can jointly form a jumper electrode 160 with low impedance. That is, the jumper electrode 160 with the low impedance can connect the adjacent first touch sensing electrodes 122. Since the jumper electrode 160 with low impedance connects the adjacent first touch sensing electrodes 122, the contact impedance between the first jumper electrode 140 in the jumper electrode 160 and the first touch sensing electrode 122 can be reduced, thereby reducing the RC loading value of the touch module 100 and improving the reliability of products. Further, because the contact impedance between the first jumper electrode 140 in the jumper electrodes 160 and the first touch sensing electrode 122 is low, it is not necessary to increase the contact area between the first jumper electrode 140 and the first touch sensing electrode 122 to reduce the contact impedance. That is, the contact area between the first jumper electrode 140 and the first touch sensing electrode 122 can be further reduced to ensure that an overlapping portion of the first jumper electrode 140 and the first touch sensing electrode 122 cannot be visible by a user (i.e., it is ensured that the overlapping portion is kept invisible). In some embodiments, a lateral contact area between the end 142 of the first jumper electrode 140 and the first touch sensing electrode 122 (e.g., a contact area between an upper surface 141 of the first jumper electrode 140 and the first touch sensing electrode 122) may be between 5000 $\mu m^2$ and 10000 $\mu m^2$. In detail, if the lateral contact area is less than 5000 $\mu m^2$, the contact impedance between the first jumper electrode 140 and the first touch sensing electrode 122 may be excessively large, thus affecting the RC loading value of the touch module 100. If the lateral contact area is greater than 10000 $\mu m^2$, the overlapping portion of the first jumper electrode 140 and the first touch sensing electrode 122 may be visible by the user, thus affecting the visual clarity of the visible area DR of the touch module 100.

Figure 4:
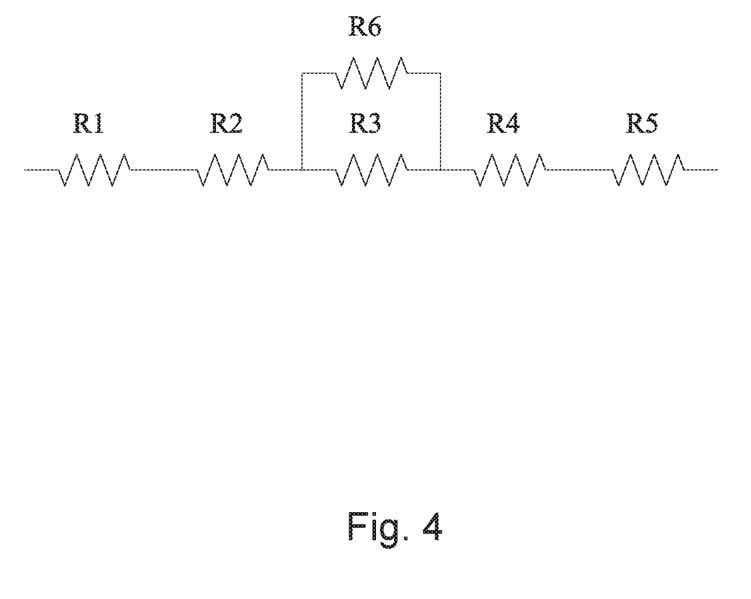
FIG. 4 is a schematic circuit layout diagram of the touch module of FIG. 2.

In some embodiments, the second jumper electrode 150 may have an impedance value of 0.20Ω to 0.24Ω to effectively reduce the contact impedance between the jumper electrode 160 and the first touch sensing electrode 122. More specifically, if the impedance value of the second jumper electrode 150 is greater than 0.24Ω, it may be impossible to control the impedance value of the jumper electrode 160 within a small range, such that the contact impedance between the jumper electrode 160 and the first touch sensing electrode 122 cannot be effectively reduced. Specifically, referring to FIG. 4, a schematic circuit layout diagram of the touch module 100 of FIG. 2 is illustrated. In FIG. 4, an impedance value R1 refers to the impedance of the upper second touch sensing layer 130 in FIG. 2, an impedance value R2 refers to the contact impedance between the first touch sensing electrode 122 and the first jumper electrode 140 on the left side in FIG. 2, an impedance value R3 refers to the impedance of the first jumper electrode 140 in FIG. 2, an impedance value R4 refers to the contact impedance between the first touch sensing electrode 122 and the first jumper electrode 140 on the right side in FIG. 2, an impedance value R5 refers to the impedance of the lower second touch sensing layer 130 in FIG. 2, and an impedance value R6 refers to the impedance of the second jumper electrode 150 in FIG. 2. As shown in FIG. 4, when the second jumper electrode 150 and the first jumper electrode 140 are connected in parallel, the impedance of a jumper electrode 160 formed by the second jumper electrode 150 and the first jumper electrode 140 is reduced. For example, when the first jumper electrode 140 with an impedance value R3 of 20Ω and the second jumper electrode 150 with an impedance value R6 of 0.22Ω are connected in parallel, a jumper electrode 160 with an impedance value of about 0.217Ω can be formed. This reduces the contact impedance between the first jumper electrode 140 in the jumper electrode 160 and the first touch sensing electrode 122, reduces the RC loading value of the touch module 100, and improves the reliability of products. In this way, the contact area between the first jumper electrode 140 and the first touch sensing electrode 122 can be further reduced to ensure that the overlapping portion of the first jumper electrode 140 and the first touch sensing electrode 122 cannot be viewed by the user.

Referring back to FIGS. 2 and 3, in some embodiments, a vertical projection area of the second jumper electrode 150 onto the substrate 110 is smaller than a vertical projection area of the first jumper electrode 140 onto the substrate 110, and the vertical projection area of the second jumper electrode 150 onto the substrate 110 is completely within the vertical projection area of the first jumper electrode 140 onto the substrate 110. Furthermore, the vertical projection area of the second jumper electrode 150 onto the substrate 110 is smaller than the vertical projection area of the intermediate section 144 of the first jumper electrode 140 onto the substrate 110 and is completely within the vertical projection area of the intermediate section 144 of the first jumper electrode 140 onto the substrate 110. In other words, the width W2 of the intermediate section 144 of the first jumper electrode 140 along the second direction D2 is greater than a width W3 of the second jumper electrode 150 along the second direction D2, and a length L1 of the intermediate section 144 of the first jumper electrode 140 along the first direction D1 is greater than a length L2 of the second jumper electrode 150 along the first direction D1. In this way, it can be ensured that the second jumper electrode 150 is firmly formed on the first jumper electrode 140, and the problem that, due to the excessively large area of the second jumper electrode 150, the overlapping portion of the first jumper electrode 140 and the second jumper electrode 150 is viewed by the user can be avoided, thus affecting the visual clarity of the visible area DR of the touch module 100.

In some embodiments, the touch module 100 further includes an insulating layer 170 laterally extending between the second jumper electrode 150 and the second touch sensing layer 130. The insulating layer 170 can separate the second jumper electrode 150 from the second touch sensing layer 130 to prevent the second jumper electrode 150 and the second touch sensing layer 130 from contacting each other, thereby ensuring that the second touch sensing layer 130 is kept electrically insulated from the first touch sensing layer 120. Further, the insulating layer 170 can also be set to avoid the spontaneous electrochemical reaction between metal materials in the second jumper electrode 150 and metal nanowires in the second touch sensing layer 130 in order to prevent the surface oxidation of the second jumper electrode 150, thus improving the reliability of products. In some embodiments, the insulating layer 170 can be further embedded between the first touch sensing electrode 122 and the second jumper electrode 150 to separate the first touch sensing electrode 122 and the second jumper electrode 150 from each other, thereby preventing the first touch sensing electrode 122 and the second jumper electrode 150 from being in contact with each other. In this way, the spontaneous electrochemical reaction can be avoided between the metal materials in the second jumper electrode 150 and the metal nanowires in the first touch sensing layer 120 in order to prevent the surface oxidation of the second jumper electrode 150, thus improving the reliability of products. In some embodiments, the insulating layer 170 can be made of an insulating (non-conductive) resin or other organic materials. For example, the insulating layer 170 may include polyethylene, polypropylene, polyvinyl butyral, polycarbonate, acrylonitrile butadiene styrene, poly(3,4-ethylenedioxythiophene), polystyrene sulfonic acid, ceramic, or combinations of any of the foregoing ingredients. In some embodiments, the insulating layer 170 includes, but is not limited to, any of the following polymers: polyacrylic resins (such as polymethacrylate, polyacrylate, and polyacrylonitrile); polyvinyl alcohol; polyesters (such as polyethylene terephthalate, polyethylene naphthalate, and polycarbonate); polymers with high aromaticity (such as phenolic resin or cresol-formaldehyde, polystyrene, polyimide, polyvinyl toluene, polyvinylxylene, polysulfone, polysulfide, polyamide, polyamideimide, polyetherimide, polyphenylene sulfide, and polyphenylene oxide); polyurethane; epoxy resin; polyolefins (such as polypropylene, polymethylpentene, and cycloolefin); polysiloxane and other silicon-containing polymers (such as polysilsesquioxane and polysilane); synthetic rubbers (such as ethylene-propylene-diene monomer, ethylene-propylene rubber, and styrene-butadiene rubber); fluoropolymers (such as polyvinylidene fluoride, polytetrafluoroethylene, and polyhexafluoropropylene); cellulose; polyvinyl chloride; polyvinyl acetate; polynorbornene; and copolymers of fluoro-olefins and hydrocarbon olefins. By the arrangement of the insulating resin or other organic materials, the second jumper electrode 150 can be electrically insulated from the second touch sensing layer 130 through the insulating layer 170, and the second jumper electrode 150 can be separated from the first touch sensing layer 120 through the insulating layer 170.

According to the aforementioned embodiments of the present disclosure, since the touch module 100 of the present disclosure has the second jumper electrode 150 made of metal materials, and the second jumper electrode 150 is connected in parallel with the first jumper electrode 140 made of metal oxide materials, the contact impedance between the first touch sensing layer 120 and the first jumper electrode 140 can be reduced, such that the RC loading value of the touch module 100 is reduced and the contact area between the first touch sensing layer 120 and the first jumper electrode 140 is reduced, thereby solving the visibility problem of the first jumper electrode 140 in the visible area DR.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure covers modifications and variations of this disclosure provided they fall within the scope of the following claims.

What is claimed is:

1. A touch module, comprising:
   a substrate;
   a first bridging layer extending on the substrate along a first direction;
   a first touch sensing layer disposed on the substrate and comprising a plurality of first touch sensing electrodes, wherein the first bridging layer connects adjacent first touch sensing electrodes of the first touch sensing electrodes;
   a second bridging layer disposed on the first bridging layer, located between the adjacent first touch sensing electrodes, and connected in parallel with the first bridging layer;
   a second touch sensing layer disposed on the substrate, crossing the second bridging layer along a second direction, and disposed between the adjacent first touch sensing electrodes; and
   an insulating layer between the second bridging layer and the second touch sensing layer, wherein the insulating layer is laterally between the first touch sensing electrodes and the second bridging layer, and a top surface of the second bridging layer is completely separated from the first touch sensing electrodes by the insulating layer in a third direction perpendicular to the first direction.

2. The touch module of claim 1, wherein a material of the second bridging layer comprises copper, aluminum, copper alloy, aluminum alloy, or combinations thereof.

3. The touch module of claim 1, wherein an impedance value of the second bridging layer is between 0.20Ω and 0.24Ω.

4. The touch module of claim 1, wherein a material of the first bridging layer comprises indium tin oxide, indium zinc oxide, cadmium tin oxide, aluminum-doped zinc oxide, or combinations thereof, and a material of each of the first touch sensing layer and the second touch sensing layer comprises a matrix and a plurality of metal nanostructures distributed in the matrix.

5. The touch module of claim 1, wherein a vertical projection area of the second bridging layer onto the substrate is smaller than a vertical projection area of the first bridging layer onto the substrate, and the vertical projection area of the second bridging layer onto the substrate is completely within the vertical projection area of the first bridging layer onto the substrate.

6. The touch module of claim 1, wherein two ends of the first bridging layer are respectively embedded into the adjacent first touch sensing electrodes, and a lateral contact area between each of the ends and each of the adjacent first touch sensing electrodes is between 5000 μm$^2$ and 10000 μm$^2$.

7. The touch module of claim 1, wherein the first direction is perpendicular to the second direction.

8. The touch module of claim 1, wherein the second touch sensing layer comprises a plurality of second touch sensing electrodes and a plurality of connecting electrodes, and the connecting electrodes connect the second touch sensing electrodes and cross the second bridging layer.

9. The touch module of claim 1, wherein the first touch sensing electrodes overlie the insulating layer.

10. The touch module of claim 1, wherein:
    a width of the first bridging layer at ends of the first bridging layer is greater than the width of the first bridging layer at a center of the first bridging layer, and
    the width is measured in the second direction.

11. The touch module of claim 1, wherein the adjacent first touch sensing electrodes directly contact a top surface of the first bridging layer.

12. The touch module of claim 1, wherein a length of the first bridging layer, as measured in the first direction, is larger than a length of the second bridging layer, as measured in the first direction.

13. A touch module, comprising:
    a substrate;
    a first bridging layer extending on the substrate along a first direction;
    a first touch sensing layer disposed on the substrate and comprising a plurality of first touch sensing electrodes, wherein:
      the first bridging layer connects adjacent first touch sensing electrodes of the first touch sensing electrodes,
      a width of the first bridging layer at ends of the first bridging layer is greater than the width of the first bridging layer at a center of the first bridging layer, and
      the width is measured in a second direction perpendicular to the first direction;
    a second bridging layer disposed on the first bridging layer, located between the adjacent first touch sensing electrodes, and connected in parallel with the first bridging layer;
    a second touch sensing layer disposed on the substrate, crossing the second bridging layer along the second direction, and disposed between the adjacent first touch sensing electrodes; and
    an insulating layer, wherein a top surface of the second bridging layer is completely separated from the first touch sensing electrodes by the insulating layer in a third direction perpendicular to the first direction.

14. The touch module of claim 13, wherein the insulating layer is laterally between the first touch sensing electrodes and the second bridging layer.

15. The touch module of claim 13, wherein the adjacent first touch sensing electrodes directly contact a top surface of the first bridging layer.

16. A touch module, comprising:
    a substrate;
    a first bridging layer extending on the substrate along a first direction;
    a first touch sensing layer disposed on the substrate and comprising a plurality of first touch sensing electrodes, wherein:
      the first bridging layer connects adjacent first touch sensing electrodes of the first touch sensing electrodes, and
      the adjacent first touch sensing electrodes directly contact a top surface of the first bridging layer;
    a second bridging layer disposed on the first bridging layer, located between the adjacent first touch sensing electrodes, and connected in parallel with the first bridging layer;

a second touch sensing layer disposed on the substrate, crosses the second bridging layer along a second direction, and disposed between the adjacent first touch sensing electrodes; and an insulating layer, wherein a top surface of the second bridging layer is completely separated from the first touch sensing electrodes by the insulating layer in a third direction perpendicular to the first direction.

17. The touch module of claim 16, wherein the insulating layer is laterally between the first touch sensing electrodes and the second bridging layer.

* * * * *